(12) United States Patent
Mosquet et al.

(10) Patent No.: US 8,093,326 B2
(45) Date of Patent: Jan. 10, 2012

(54) USE OF DISPERSANT FOR AQUEOUS COMPOSITIONS OF CALCIUM SULPHATE HEMIHYDRATE

(76) Inventors: Martin Mosquet, Dadonville (FR); Philippe Maitrasse, Chilleurs aux Bois (FR); Isabelle Dubois, Avon (FR)

( * ) Notice: Subject to any disclaimer, the term of this patent is extended or adjusted under 35 U.S.C. 154(b) by 0 days.

(21) Appl. No.: 10/484,653

(22) PCT Filed: Jul. 23, 2002

(86) PCT No.: PCT/FR02/02628
§ 371 (c)(1),
(2), (4) Date: Jul. 30, 2004

(87) PCT Pub. No.: WO03/010110
PCT Pub. Date: Feb. 6, 2003

(65) Prior Publication Data
US 2004/0266932 A1    Dec. 30, 2004

(30) Foreign Application Priority Data
Jul. 23, 2001 (FR) ..................... 01 09801

(51) Int. Cl.
| | |
|---|---|
| *C04B 24/26* | (2006.01) |
| *C04B 28/14* | (2006.01) |
| *C08J 3/00* | (2006.01) |
| *C08K 3/00* | (2006.01) |
| *C08K 3/10* | (2006.01) |
| *C08K 3/22* | (2006.01) |
| *C08K 3/30* | (2006.01) |
| *C08L 31/00* | (2006.01) |
| *C08L 33/00* | (2006.01) |
| *C08L 33/06* | (2006.01) |
| *C09B 67/00* | (2006.01) |
| *C09D 5/02* | (2006.01) |

(52) U.S. Cl. ............ 524/423; 523/344; 524/5; 524/436; 524/556; 524/560

(58) Field of Classification Search .................. 524/423, 524/436, 5, 556, 560; 523/344
See application file for complete search history.

(56) References Cited

U.S. PATENT DOCUMENTS

| | | | | |
|---|---|---|---|---|
| 4,028,125 A | * | 6/1977 | Martin .......................... | 106/717 |
| 4,067,939 A | * | 1/1978 | Lowe et al. ..................... | 264/42 |
| 4,157,264 A | * | 6/1979 | Kennedy-Skipton ............. | 524/5 |
| 4,341,560 A | * | 7/1982 | Saito et al. ......................... | 524/5 |
| 5,148,645 A | * | 9/1992 | Lehnert et al. .................. | 52/443 |
| 5,424,099 A | * | 6/1995 | Stewart et al. ............. | 427/397.7 |
| 5,707,445 A | | 1/1998 | Yamato et al. ................ | 106/802 |
| 6,264,739 B1 | | 7/2001 | Yamato et al. ................ | 106/778 |
| 6,527,850 B2 | | 3/2003 | Schwartz et al. ............. | 106/772 |
| 2002/0124773 A1 | * | 9/2002 | Diesso ............................ | 106/35 |
| 2003/0066456 A1 | * | 4/2003 | Langford ...................... | 106/244 |
| 2005/0250888 A1 | * | 11/2005 | Lettkeman et al. ........... | 524/200 |

FOREIGN PATENT DOCUMENTS

| | | |
|---|---|---|
| EP | 0 870 784 A1 | 10/1998 |
| EP | 0 931 799 A2 | 7/1999 |
| EP | 0 995 727 A1 | 4/2000 |
| EP | 1052232 A1 | 11/2000 |
| EP | 0 753 488 B1 | 4/2002 |
| EP | 0 799 807 B1 | 7/2002 |
| EP | 0 792 850 B1 | 10/2003 |
| FR | 2776285 | 9/1999 |
| GB | 2319522 | 5/1998 |

OTHER PUBLICATIONS

Lewis, Richard J., Sr. (2002). Hawley's Condensed Chemical Dictionary (14th Edition). John Wiley & Sons. Definition for "calcium sulfate". Online version available at: <http://www.knovel.com/knovel2/Toc.jsp?BookID=704&VerticalID=0>.*

* cited by examiner

*Primary Examiner* — Patrick Niland
(74) *Attorney, Agent, or Firm* — McCarter & English, LLP

(57) ABSTRACT

The invention concerns the use of a selected polycarboxylic type dispersant for aqueous calcium sulfate hemihydrate compositions that, simultaneously with its dispersing action, can control the initial setting and/or final setting times for these compositions. The invention also concerns aqueous calcium sulfate hemihydrate compositions comprising a polycarboxylic type dispersant or a mixture of polycarboxylic type dispersants.

28 Claims, No Drawings

USE OF DISPERSANT FOR AQUEOUS COMPOSITIONS OF CALCIUM SULPHATE HEMIHYDRATE

CROSS-REFERENCE TO RELATED APPLICATIONS

This application claims priority to French Patent Application No. FR 01/09801, filed Jul. 23, 2001.

The present invention relates to the use of a polycarboxylic type dispersant selected from dispersants of said type for aqueous calcium sulfate hemihydrate compositions providing both a dispersing effect and controlling the initial and final setting times for said compositions. The invention also relates to aqueous calcium sulfate hemihydrate compositions comprising such a selected dispersant.

Within the context of the present invention, the term "aqueous calcium sulfate hemihydrate compositions" means compositions in which the calcium sulfate hemihydrate represents at least 80% by weight of the total hydraulic binder.

Such compositions are known for use in producing construction elements such as plasterboard or wallboard, which are continuously produced on industrial production lines.

Depending on the case, adding a dispersant to such aqueous calcium sulfate hemihydrate compositions must allow the following:
A reduction in the water content;
and/or a certain fluidity;
and/or an improvement in workability;
and/or maintenance of rheology over time;
and/or a stabilization of the foam formed when preparing such aqueous calcium sulfate hemihydrate compositions.

All of the above performances must also be achieved while keeping the setting times (initial and final set) compatible with the envisaged application.

In general, polycarboxylic type dispersants are essentially constituted by polymers comprising a polycarboxylic chain, optionally in its salt form, to which polyether chains are fixed via an ester function.

Such polycarboxylic dispersants are known and have been claimed for use in aqueous powdered mineral particle compositions, in particular calcium sulfate hemihydrate compositions, to bring to bear therein not only their interesting dispersing property but also, and simultaneously, one or other of the properties mentioned above, such as an improvement in the fluidity of the aqueous calcium sulfate hemihydrate compositions, controlling foam formation during the preparation and use of said compositions, maintaining rheological characteristics over time, or others, for example.

It is also known, however, that polycarboxylic type dispersants, when used in aqueous calcium sulfate hemihydrate compositions, can cause random variations of varying magnitudes in calcium sulfate hemihydrate setting times, which variations are particularly annoying when they manifest themselves by a retardation in the initial set and often considerably delay the final set, so that the setting time itself can become random in nature and may be prolonged to a duration of a prejudicial nature.

Thus, this phenomenon can occur when aqueous calcium sulfate hemihydrate compositions containing a polycarboxylic type dispersant are supplied to plasterboard or wallboard production lines. In the case, for example, of a plasterboard production line, the initial and final setting times for the aqueous calcium sulfate hemihydrate composition employed must necessarily be precise and vary only slightly, as plasterboard is cut on the production line when setting of the aqueous composition employed is sufficiently advanced so that each board, at the moment it is cut, can sustain that cut and its constituent material is in a state of cohesion and hardness such that the board, once cut, can undergo the mechanical manipulations necessary for continuing the production cycle to its completion without suffering damage.

For this reason, industrial processes for continuous production of plaster articles such as plasterboard or wallboard necessitate regularity in the initial and final setting times for the aqueous calcium sulfate hemihydrate compositions employed regardless of the dispersant used, in particular when the dispersant is of the polycarboxylic type, so that industrial processes for the continuous production of said plaster articles are robust, i.e. protected from random variations in the setting times for the compositions employed, which variations can be attributed to the chemical structure of the polycarboxylic type dispersant and/or possible variations in the quantity of said agent in the aqueous compositions of calcium sulfate hemihydrate employed.

A number of publications testify to the importance of studies pertaining to polycarboxylic type dispersants, but also pertaining to other joint characteristics simultaneously accompanying the first and essential characteristic of dispersion.

In a first document (GB 2 319 522A), an aqueous composition for artificial plaster having a pH of 5 to 10 is described, comprising as the dispersant and plasticizer a copolymer obtained by radical polymerization of a monomer (a) of a polyalkylene glycol monoester containing 2 to 300 molecules of $C_2$-$C_3$ oxyalkylene with at least one monomer (b) selected from unsaturated monocarboxylic acids, unsaturated dicarboxylic acids and allylsulfonic acids. According to that patent, a batch of artificial plaster with an adjusted pH of between 5 and 10 and comprising the simultaneous dispersant and plasticizer has both good plaster particle dispersion and excellent composition fluidity.

A further document (U.S. Pat. No. 6,264,739) describes a dispersant employed in an aqueous calcium sulfate hemihydrate composition which simultaneously benefits from an excellent stabilizing effect on the foam formed when preparing the composition. That agent, which is both a plaster particle dispersant and a stabilizing agent for the foam formed, and is polycarboxylic in type, is obtained by radical copolymerization of a monomer a) of a polyalkylene glycol monoester containing at most 300 C2 and/or C3 oxyalkylene molecules with at least one monomer b) selected from unsaturated monocarboxylic acids, unsaturated polycarboxylic acids and alkylsulfonic acids. As stated in that document, an aqueous calcium sulfate hemihydrate composition comprising that polycarboxylic type copolymer simultaneously exhibits good dispersion of calcium sulfate hemihydrate particles and also good stabilization of the foam effect which appears when preparing said composition.

A further document (EP0931799) describes an aqueous cement composition which comprises a cement or hydraulic binder such as Portland cement, a high alumina cement, mixtures of cements and possibly hydraulic materials such as gypsum, which is a calcium sulfate dihydrate, and an adjuvant which is a polycarboxylic type copolymer resulting from copolymerizing monomers of:

Type 1:

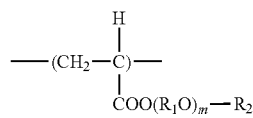

which is an acrylic acid ester having ethylene oxide and/or propylene oxide groups.

Type 2:

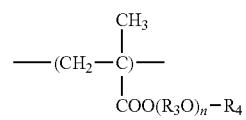

which is a methacrylic acid ester having ethylene oxide and/or propylene oxide groups.

Type 3:

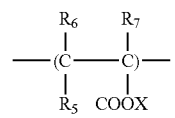

which is an unsaturated mono- or polycarboxylic acid.

The presence of said polycarboxylic type adjuvant as claimed in aqueous cement, mortar or concrete compositions is indispensable since it simultaneously acts as a dispersant and is involved in that same aqueous composition as a fluid loss control agent both at high temperatures and at low temperatures, said composition retaining excellent spreading capacity.

A further document (EP-A-0753488) describes and claims a dispersant for cement compositions.

That dispersant is a polycarboxylic copolymer obtained by copolymerizing:

a monomer a) of type:

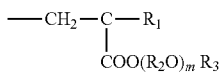

which is an ester of an alkoxypolyalkylene glycol mono (meth)acrylic acid;

with a monomer b) of type:

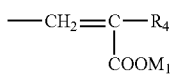

which is a (meth)acrylic acid.

The use of said polycarboxylic type dispersant in cement compositions is justified by the fact that it is not only involved because of its well-known specificity as a dispersant for cement particles but also, and simultaneously with the first and principal specific property, it is involved in said cement compositions as an agent providing other fundamental characteristics, in particular those of acting as an agent for increasing and maintaining the flowability of cement compositions despite a drastic reduction in the quantity of water present in the composition, of regulating the quantity of air involved in the composition and, finally, of obtaining a strong concrete.

Finally, a further document (EP1052232) also describes and claims a polycarboxylic type dispersant for cement compositions that can optionally contain gypsum.

That polycarboxylic type dispersant, which is in the powdered form, is a copolymer resulting from copolymerizing:

a monomer of type:

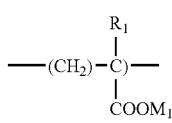

which is a (meth)acrylic acid;

with a further monomer of type:

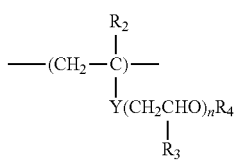

which is a compound with an acrylic or methacrylic structure comprising a polyalkylene chain.

Using that polycarboxylic type dispersant simultaneously endows the cement composition with two essential characteristics, namely cement particle dispersion and excellent composition fluidity, despite a reduction in the quantity of water present.

Thus, from observing the prior art:
despite the substantial improvements proposed and provided by polycarboxylic dispersants in aqueous calcium sulfate hemihydrate compositions or aqueous cement compositions that may possibly contain gypsum, which improvements are simultaneously the essential characteristic of dispersion and a further associated characteristic such as an improvement in or maintenance of the fluidity of said compositions despite a large reduction in the quantity of water, or control of the foam effect during preparation of compositions, or other characteristics such as those mentioned above;
none of them either suggests or deals with the major disadvantage, namely the occurrence of a random variability in the initial and final setting time provided by polycarboxylic type dispersants in aqueous calcium sulfate hemihydrate compositions, which variability is particularly annoying in industrial facilities for the continuous production of objects such as plasterboard or wallboard.

The Applicant has now discovered, by selection, a polycarboxylic type dispersant for aqueous calcium sulfate hemihydrate compositions that, simultaneously with its dispersing action, can control the initial and/or final setting times for aqueous calcium sulfate hemihydrate compositions compared with those of prior art polycarboxylic type dispersants.

More precisely, the invention concerns the use of a dispersant selected from polycarboxylic type dispersants for aqueous calcium sulfate hemihydrate compositions that, simultaneously with its dispersing action, can control the initial and/or final setting time, said dispersant comprising at least 75% by number of a random linear chain formation of structural units (1) and (2) represented by the following formulae:

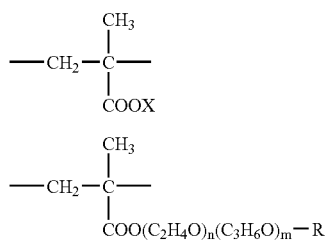

in which X represents a hydrogen atom, an alkali metal, an alkaline-earth metal or an ammonium; said structural units (1) may be identical or different; n is a whole number varying from 1 to 250, m is a whole number varying from 0 to 100 where m<n; the propylene oxide groups may or may not be randomly distributed among the ethylene oxide groups; R represents an alkyl group containing 1 to 12 carbon atoms; said structural units (2) may be identical or different; the ratio of the number of structural units (2) to the total number of structural units (1) and (2) being comprised between 5% and 60%.

Within the context of the present invention, the term "control of the initial and final setting times for aqueous calcium sulfate hemihydrate compositions" means that the dispersants used in said compositions cause neither a significant variation in the initial and final setting times, which may be manifested by a substantial increase or reduction in said times, nor a significant variation in the setting time, which is the difference between the final setting time and the initial setting time: such significant variations are more generally manifested by a sufficiently marked retardation in these times, which retardation would perturb the normal methods for regulating the initial and final setting times, in particular practiced in industrial processes for the continuous production of articles such as plasterboard or wallboard.

The selected polycarboxylic type dispersant used in an aqueous calcium sulfate hemihydrate composition of the invention can comprise at most 25% by number of structural units other than structural units (1) and (2). Examples of said units that can be cited are units formed from unsaturated monomers comprising sulfone-containing groups or alkyl ester groups. However, such units constituted by monomers that are known in the art to cause a sufficiently marked retardation in the setting time, for example phosphone-containing or phosphate-containing monomers, are units which should be avoided.

In accordance with a preferred variation of the invention, the selected polycarboxylic type dispersant used in the compositions of the invention comprises at least 90% by number of structural units (1) and (2), more preferably 100% by number of structural units (1) and (2), excluding units acting as chain terminations in connection with methods for initiating polymerization and chain length control.

Preferably again, the selected dispersant of the invention has a chemical structure having one or more of the following characteristics:
  m equals zero and n is a whole number varying from 5 to 160;
  better still, m equals zero and n is a whole number varying from 7 to 120;

R represents an alkyl group containing 1 to 5 carbon atoms; better still, R is a methyl, ethyl, propyl or butyl radical.

Preferably, the selected dispersant used in the context of the invention is such that the ratio of the number of structural units (2), which corresponds to esters of structural units (1), to the total number of structural units (1) and (2) is comprised between 5% and 50%.

The invention also concerns aqueous calcium sulfate hemihydrate compositions comprising a dispersant which, simultaneously with its dispersing action, can control the initial and/or final setting times for aqueous calcium sulfate hemihydrate compositions, said dispersant being selected from polycarboxylic dispersants comprising at least 75% by number of a random linear chain formation of structural units (1) and (2) represented by the following formulae:

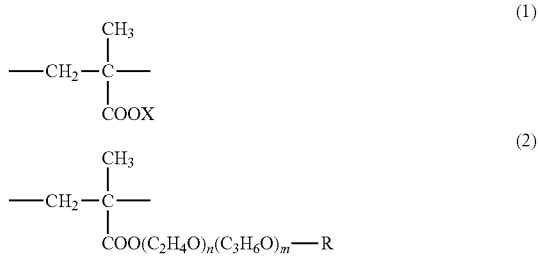

in which X represents a hydrogen atom, an alkali metal, an alkaline-earth metal or an ammonium, said structural units (1) may be identical or different; n is a whole number varying from 1 to 250, m is a whole number varying from 0 to 100 where m<n; the propylene oxide groups may or may not be randomly distributed among the ethylene oxide groups; R represents an alkyl group containing 1 to 12 carbon atoms; said structural units (2) may be identical or different; the ratio of the number of structural units (2) to the total number of structural units (1) and (2) being comprised between 5% and 60%.

The compositions of the invention which achieve the best performances are those which comprise one of the selected dispersants presented above.

In particular, the best results were obtained when the dispersants of the invention comprise 100% by number of structural units (1) and (2), excluding units active as chain terminations, in which m equals zero, n varies from 7 to 120 and in which the ratio of the number of structural units (2), which correspond to esters of structural units (1), to the total number of structural units (1) and (2) is comprised between 15% and 40%.

Advantageously, the quantity of any residual reagents remaining after producing the dispersant of the invention (usually termed residual reagents) that have led to the formation of structural units (1) and/or (2), is equal to 20% or less by weight with respect to the total dry weight of the dispersant. When the dispersant is obtained by partial esterification, catalyzed by a base, by reacting a polymethacrylic acid with a polyether containing a free hydroxyl group that can react with a carboxylic function, in accordance with the second production mode described below, the quantity of any residual reagents is preferably less than 10% by weight, more preferably less than 2% by weight with respect to the total dry weight of the dispersant.

The mass average molecular weight "Mw" of the dispersant of the invention, measured by steric exclusion chromatography using a polyethylene glycol reference, is generally from about 1000 to about 100 000 grams per mole (Daltons), preferably from about 10 000 to about 80 000.

Controlling the setting times for aqueous calcium sulfate hemihydrate compositions by selecting the dispersant of the invention from polycarboxylic dispersants constitutes an extremely important improvement for a number of applications, in particular for calcium sulfate hemihydrate compositions intended for the production of plasterboard and wallboard type elements.

Advantageously, the weight ratio, as the weight of water/calcium sulfate hemihydrate (W/P), can be in the range 0.55 to 0.75.

Advantageously, the quantity of selected dispersant added to the aqueous calcium sulfate hemihydrate composition is comprised between 0.01% and 2% dry weight with respect to the weight of calcium sulfate hemihydrate.

A variety of other additives that are known in the art for aqueous calcium sulfate hemihydrate compositions can also be added to the compositions of the invention. Examples that can be cited are setting accelerators and antifoaming agents.

A variety of processes can be envisaged for producing the selected dispersant used in the context of the present invention.

In accordance with a first production process, the selected dispersant of the invention can be obtained by copolymerizing a monomer (a) represented by formula (A) below with at least one monomer (b) selected from compounds represented by formula (B) below:

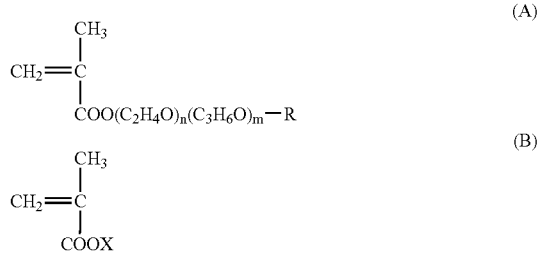

in which X represents a hydrogen atom, an alkali metal, an alkaline-earth metal or an ammonium; n is a whole number varying from 1 to 250, m is a whole number varying from 0 to 100 where m<n; the propylene oxide groups may or may not be randomly distributed among the ethylene oxide groups; R represents an alkyl group containing 1 to 12 carbon atoms.

In accordance with a second mode of production, the selected dispersant of the invention can be obtained by partial esterification, catalyzed by a base, by reacting a polymethacrylic acid with a polyether containing a free hydroxyl group that can react with a carboxylic function, optionally in its salt form, of said polymethacrylic acid, with general formula:

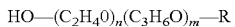

in which n is a whole number varying from 1 to 250, m is a whole number varying from 0 to 100 where m<n; the propylene oxide and ethylene oxide groups may or may not be randomly distributed; and R represents an alkyl group containing 1 to 12 carbon atoms.

In the context of the second mode for producing the selected dispersant of the invention, the polyalkylene glycol polyether or alkylether with general formula HO—$(C_2H_4O)_n$$(C_3H_6O)_m$—R is preferably such that:

R represents an alkyl group containing 1 to 5 carbon atoms, or better still, R is a methyl, ethyl, propyl or butyl radical;

m equals 0 and n is a whole number from 5 to 160; preferably, n is a whole number from 7 to 120.

In the context of the second mode for producing the selected dispersant of the invention, the polymethacrylic acid is obtained by polymerizing a mixture of monomers comprising at least 75 mole % of methacrylic acid and at most 25 mole % of a methacrylic acid co-monomer, more preferably by polymerizing 100% of methacrylic acid, excluding the extremities.

Within the context of the second mode for producing the selected dispersant of the invention, the base used to catalyze the partial esterification reaction is an alkali metal hydroxide, preferably sodium or lithium hydroxide. A tertiary amine can also be used as the base.

To prepare the selected dispersant of the invention for aqueous calcium sulfate hemihydrate compositions, reference can be made to the detailed description of the process given in French patent FR-A-2 776 285.

The selected dispersant of the invention can be obtained by a variety of production processes that are known per se.

However, the dispersants of the invention are preferably selected from those which derive from a partial esterification process, catalyzed using a base, as defined above.

The best results were achieved with the selected dispersants obtained using the second mode for preparing said dispersant, one explanation possibly being that the residual reagents content is very limited.

The properties of the selected dispersant within the context of the present invention can be successfully exploited to produce aqueous calcium sulfate hemihydrate compositions intended for the production of plasterboard and wallboard.

The selected dispersant for aqueous calcium sulfate hemihydrate compositions of the invention can be used alone or in combination with a further selected dispersant within the context of the invention. Thus, dispersion of calcium sulfate hemihydrate in the aqueous compositions of the invention can be ensured by a mixture of selected dispersants as defined within the context of the invention.

The selected dispersant within the context of the present invention can also be used in combination with other more conventional dispersants, such as those derived from condensing formaldehyde and sulfone-containing naphthalenes or those derived from condensing formaldehyde and sulfone-containing melamines, provided that those more conventional dispersants do not have any significant effect on the initial and final setting times for the plaster used.

The following non-limiting examples illustrate the present invention.

Preparation of Dispersants
First Preparation Mode

In a first preparation mode, the selected dispersant of the invention is prepared by copolymerizing:
  methacrylic acid sold by SIGMA-ALDRICH;
  with a methyl polyethylene glycol methacrylate with a variable mass average molar mass sold by SIGMA-ALDRICH.

In the remainder of the examples, the first mode for preparing the dispersant will be referred to by the abbreviated term "copolymerization".

Second Preparation Mode

In a second mode for preparation by partial esterification, catalyzed using a base, the selected dispersant of the invention is obtained by reacting the following:

either a polyacrylic acid with a mass average molar mass of 4000 g/mol (Daltons) diluted to 50% in water and sold by BASF under the trade name Sokalan CP 10S;

or a polymethacrylic acid with a mass average molar mass of 4000 g/mol (Daltons) by steric exclusion chromatography diluted to 30% in water and obtained by polymerizing methacrylic acid in the presence of thioglycolic acid catalyzed by hydrogen peroxide;

with a polyether containing a free hydroxyl group that can react with a carboxylic function of said poly(meth)acrylic acid, with a variable mass average molar mass, sold by SIGMA-ALDRICH.

Reference should be made to the detailed description of the process given in French patent FR-A-2 776 285 for the preparation of the selected dispersants in accordance with this second preparation mode.

In the remainder of the examples, the second mode for preparing the selected dispersant will be referred to by the abbreviated term "esterification".

CHARACTERISTICS OF DISPERSANTS TESTED IN THE EXAMPLES

The characteristics of these dispersants are shown in the following table:

| Dispersant reference | Preparation mode | Nature of polyacid | Mean no of ethylene oxide motifs per polyether chain | Percentage[2] of ester functions in dispersant |
|---|---|---|---|---|
| PRIOR ART | A | esterification | polyacrylic acid | 45 | 20 |
| | B | esterification | polyacrylic acid | 25 | 40 |
| INVENTION | C | esterification | polymethacrylic acid | 45 | 20 |
| | D | esterification | polymethacrylic acid | 25 | 20 |
| | E | esterification | polymethacrylic acid | 25 | 25 |
| | F | esterification | polymethacrylic acid | 25 | 30 |
| | G | esterification | polymethacrylic acid | 27 | 40 |
| | H[1] | copolymerization | — | 45 | 20 |
| | I[1] | copolymerization | — | 25 | 30 |
| | J[1] | copolymerization | — | 17 | 40 |
| | K[1] | copolymerization | — | 25 | 40 |
| | L[1] | copolymerization | — | 45 | 40 |
| | M[1] | copolymerization | — | 25 | 50 |
| | N[1] | copolymerization | 11 | 7 | 40 |

[1] to prepare dispersants H, I, J, K, L, M, N, only methacrylate and methacrylic acid type monomers were used.
[2] the percentage of ester function in the dispersant is equal to the ratio of the number of ester functions to the sum, brought to 100, of the number of ester functions and the number of carboxylic acid functions, optionally in the salt form. This percentage corresponds to the ratio of the number of structural units (2) to the total number of structural units (1) and (2) described in the present application.

The conditions for evaluating the various compounds (with references A to M) used as a dispersant to simultaneously with their dispersing action control the initial and final setting times for aqueous calcium sulfate hemihydrate compositions are described below.

A/ Conditions for Tests for Evaluating the Dispersants of the Examples used in an Aqueous Calcium Sulfate Hemihydrate Composition The calcium sulfate hemihydrate (i.e. plaster) used was obtained from Taverny gypsum (France).

The dispersants were used in aqueous solution containing 20% to 30% of active material and were evaluated by means of spread measurements and by measuring the initial and final setting times in a plaster batch prepared using the following preparation mode.

A1. The Mode for Preparing a Plaster Batch is Described Below

Firstly, a plaster batch comprising the following was prepared:
   190 g of plaster;
   123.5 g of water;
   and X% dry weight of the dispersant, with respect to the quantity of plaster.

The water/plaster weight ratio was 0.65.

Operating Mode 123.5 g of mains water at ambient temperature (23° C.±2° C.) was weighed into a mortar mixing bowl. At t=0, 190 g of plaster were scattered onto the water over a maximum of 10 seconds.

At t=0+30 s, the mixture was mixed, describing about 30 figure-of-8 movements using a spatula, or using a mixer. After mixing for 30 seconds, a homogeneous paste was obtained.

A2. Determination of Spread

Immediately after mixing as described above, at t=0+1 min, a "Smith's ring" mold which had been centered on a flat, smooth and clean SECURIT type plate of glass was carefully filled to the brim, smoothing the surface, with the plaster batch prepared as described above.

The Smith's ring used, which had been placed on said glass plate, was a cylindrical stainless steel mold with the following characteristics:
   height: 50 mm±0.1 mm
   internal diameter: 60 mm±0.1 mm.

At t=0+1 min 15 s, the Smith's ring was slowly removed and the diameter in millimeters of the plaster cake formed was measured along two perpendicular directions.

The spread was determined by measuring the diameter of the plaster cake formed on the glass plate along two perpendicular directions.

A3. Determination of the Setting Time for a Pure Plaster Paste

The setting time is the difference between the initial setting time and the final setting time.

Operating Mode

A plaster cake was prepared on a glass plate using the preparation mode described above. Grooves were then made rectilinearly at regular intervals in the pure paste using a knife with a defined blade thickness and height. The knife blade had to be held in a vertical plane and form an angle of about 30° with the plate. The grooves had to be spaced about 1 cm apart.

The characteristics of the knife blade used were as follows:
   blade thickness (upper edge): about 2.30 mm;
   blade height: about 18 mm maximum.

Determination of initial setting time:

The initial setting time corresponds to the moment at which the groove no longer closes over its entire length for pure paste.

As a result, the initial setting time is the time at which the groove formed in the paste no longer closes over its entire length.

Determination of Final Setting Time

The final setting time corresponds to the moment at which a defined surface hardness is achieved.

The final setting time was determined using a Shore A needle.

Said needle was applied perpendicularly to the surface of the pure plaster paste, progressively and without jerking. Setting was achieved when the superficial hardness was 40 units using a Shore A.

The various tests are shown below.

1st Series of Examples, Showing the Influence of the Nature of the "Polyacid" in the Dispersant The results obtained are shown in the following table:

| Dispersant reference | Dispersant, dry extract wt % | Spread (mm) | Initial set (min) | Final set (min) | Setting time (min) |
|---|---|---|---|---|---|
| A$_{(PA)}$ | 0.08 | 155 | 11'50 | 28'50 | 17'00 |
| C$_{(I)}$ | 0.08 | 156 | 05'10 | 14'20 | 09'10 |
| H$^{(1)}{}_{(I)}$ | 0.08 | 122 | 05'30 | 17'40 | 12'10 |
| B$_{(PA)}$ | 0.15 | 160 | 24'30 | 45'00 | 21'30 |
| G$_{(I)}$ | 0.15 | 131 | 05'00 | 18'20 | 13'20 |
| K$^{(1)}{}_{(I)}$ | 0.15 | 142 | 05'20 | 18'50 | 13'30 |

$_{(I)}$Invention
$_{(PA)}$Prior art

The observed results show a longer initial setting time for pure pastes comprising dispersants A and B, constituting the prior art, than for the other selected dispersants of the invention. It can also be seen that the final setting time is extended. As a result, the setting time for plaster cakes produced with dispersants A and B (prior art) is much longer than the setting time for plaster cakes produced from other selected dispersants of the invention. Dispersants formed from polymethacrylic acid (by the second preparation mode: esterification) or from methacrylic acid and methyl polyethylene glycol methacrylate (by the first preparation mode: copolymerization) behave positively as regards the setting time for plaster cakes (i.e. a reduction in setting time) compared with dispersants obtained from polyacrylic acid (random substantial variations in setting time).

2nd Series of Examples, Showing the Influence of Dispersant Concentration

The results obtained are shown in the table below:

| Dispersant reference | Dispersant, dry extract wt % | Spread (mm) | Initial set (min) | Final set (min) | Setting time (min) |
|---|---|---|---|---|---|
| A$_{(PA)}$ | 0.15 | 163 | 17'30 | 38'40 | 22'10 |
| A$_{(PA)}$ | 2 | 157 | >30'00 | >>45'00 | — |
| C$_{(I)}$ | 0.15 | 177 | 05'30 | 13'30 | 08'00 |
| C$_{(I)}$ | 2 | 210 | 07'10 | 16'00 | 08'50 |
| B$_{(PA)}$ | 0.15 | 160 | 24'30 | 45'00 | 21'30 |
| B$_{(PA)}$ | 2 | 158 | >45'00 | >>60'00 | — |
| G$_{(I)}$ | 0.15 | 131 | 05'00 | 18'20 | 13'20 |
| G$_{(I)}$ | 2 | 140 | 05'30 | 19'30 | 14'00 |

The results show an increase in the setting time for plaster cakes when the % dry extract of the dispersant is increased, for the different dispersants employed. However, this increase in the setting time is greatly exacerbated when using dispersants A and B (prior art) compared with that of dispersants C and G (selected dispersant of the invention).

These results show a significant increase in the setting time when the dispersant is used in a high concentration and is obtained from polyacrylic acid.

3rd Series of Examples, Concerning the Influence of the Percentage of Ester Functions in the Selected Dispersant of the Invention The amount of dispersants as a percentage of dry extract was 2% for dispersants obtained by the second preparation mode (esterification) and 0.1% for those obtained by the first preparation mode (copolymerization). The results are shown in the table below:

| Dispersant reference | Percentage$^{(2)}$ of ester functions in the dispersant | Spread (mm) | Initial set (min) | Final set (min) | Setting time (min) |
|---|---|---|---|---|---|
| D | 20 | 204 | 09'10 | 22'20 | 13'10 |
| E | 25 | 195 | 06'00 | 15'00 | 09'00 |
| F | 30 | 183 | 05'15 | 14'30 | 09'15 |
| I$^{(1)}$ | 30 | 170 | 07'00 | 17'50 | 10'50 |
| K$^{(1)}$ | 40 | 155 | 06'50 | 17'30 | 11'20 |
| M$^{(1)}$ | 50 | 127 | 05'40 | 19'40 | 14'00 |

$^{(1)}$to prepare dispersants H, I, J, K, L, M, only methacrylate and methacrylic acid type monomers were used.
$^{(2)}$this percentage equals the ratio of the number of ester functions over the sum, brought to 100, of the number of ester functions and the number of carboxylic acid functions, optionally in the salt form.

$^{(1)}$ to prepare dispersants H, I, J, K, L, M, only methacrylate and methacrylic acid type monomers were used.
$^{(2)}$ this percentage equals the ratio of the number of ester functions over the sum, brought to 100, of the number of ester functions and the number of carboxylic acid functions, optionally in the salt form.

A reduction in the spread value is observed when the percentage of ester functions in the dispersant is increased. A reduction in the initial setting time is also observed when the percentage of ester functions in the dispersant increases, regardless of the dispersant preparation mode. Furthermore, the setting time for the plaster cakes is controlled. Thus, increasing the percentage of ester functions in the dispersant has no significant effect on plaster cake setting.

4th Series of Examples, with Selected Dispersants of the Invention with Different Polyether Chain Lengths The amount of dispersants, as a percentage weight of dry extract, was 0.1%. The results are shown in the following table:

| Dispersant reference | (n) mean number of ethylene oxide motifs | Spread (mm) | Initial set (min) | Final set (min) | Setting time (min) |
|---|---|---|---|---|---|
| J$^{(1)}$ | 17 | 160 | 07'15 | 19'30 | 12'15 |
| K$^{(1)}$ | 25 | 155 | 06'50 | 17'30 | 11'20 |
| L$^{(1)}$ | 45 | 128 | 05'50 | 18'00 | 12'10 |
| G$^{(1)}$ | 27 | 131 | 05'00 | 18'20 | 13'20 |
| N$^{(1)}$ | 7 | 150 | 06'15 | 16'30 | 10'15 |

A reduction in the spread value for plaster cakes is observed when the number of ethylene oxide motifs in the polyether chain of the dispersant is increased to a high percentage of ester functions (40%). A reduction in the initial setting time is observed when the number of ethylene oxide motifs in the polyether chain increases. Furthermore, the setting time is controlled. The results obtained show that an increase in the number of ethylene oxide motifs in the polyether chain of the test dispersants has no significant effect on the plaster cake setting time.

5th Series of Examples, with the Selected Dispersants of the Invention Obtained Using the First and Second Preparation Modes Defined Above The amount of dispersants, as a percentage by weight of dry extract, was 0.1%. The results are shown in the following table:

| Dispersant reference | Preparation mode | Spread (mm) | Initial set (min) | Final set (min) | Setting time (min) |
|---|---|---|---|---|---|
| C | esterification | 180 | 04'00 | 12'00 | 08'00 |
| H[(1)] | copolymerization | 122 | 05'30 | 17'40 | 12'10 |
| C supplemented with residual reagents[(a)] | — | 174 | 06'00 | 18'10 | 12'10 |
| F | esterification | 170 | 04'50 | 16'00 | 11'10 |
| I[(1)] | copolymerization | 148 | 06'25 | 17'00 | 10'35 |
| F supplemented with residual reagents[(b)] | — | 165 | 05'55 | 16'45 | 10'50 |

[(a)] and [(b)] the quantity of residual reagents added to dispersants C and F was 20%.

The results show better spread performances with dispersants C and F than with dispersants H[(1)] and I[(1)]. Plaster cakes produced from dispersants H[(1)] and I[(1)] have a longer initial setting time than plaster cakes produced from dispersants C and F. These results show that dispersants prepared by copolymerization retard the initial setting compared with dispersants produced by esterification for equivalent structures.

Furthermore, an analysis of dispersants H[(1)] and I[(1)] obtained by the first preparation mode (copolymerization) shows the presence of residual reagents. The concentration of residual reagents was determined to be about 20% by weight compared with the total weight of the dispersant as a dry extract.

These results also show that if residual reagents are added to dispersants C and F obtained by the second preparation mode (esterification) in an amount of 20% by weight of residual reagents with respect to the total weight of dry dispersant, the initial setting and final setting times for plaster cakes including dispersants C and F to which residual reagents have been added are retarded with respect to dispersants C and F without residual reagents. The presence of residual reagents in the dispersant appears to be one explanation for the set retardations observed with plaster cakes comprising a dispersant of the polycarboxylic type obtained by copolymerization.

The invention claimed is:

1. A process for dispersing an aqueous calcium sulfate hemihydrate composition and controlling the initial setting and/or final setting time of said aqueous calcium sulfate hemihydrate, comprising the steps of:
providing an aqueous calcium sulfate hemihydrate composition having a weight ratio of water/calcium sulfate hemihydrate of 0.55 to 0.75; and
admixing with the aqueous calcium sulfate hemihydrate a selected polycarboxylic dispersant, said dispersant comprising between 0.01% and 2% dry weight with respect to the weight of the calcium sulfate hemihydrate, and wherein the polycarboxylic dispersant comprises at least 75% by number, excluding terminal chain units, of a random linear chain formation of structural units (1) and (2) represented by the following formulae:

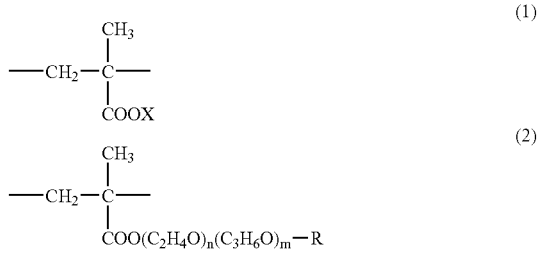

in which X represents a hydrogen atom, an alkali metal, an alkaline-earth metal or an ammonium; said structural units (1) may be identical or different; n is a whole number varying from 1 to 250, m is 0; the propylene oxide groups may or may not be randomly distributed among the ethylene oxide groups; R represents an alkyl group containing 1 to 12 carbon atoms; said structural units (2) may be identical or different; the ratio of the number of structural units (2) to the total number of structural units (1) and (2) being comprised between 5% and 60%, and wherein in a "Smith's Ring" plaster cake test performed at 23° C.±2° C. said dispersant controls the initial and final setting times for the aqueous calcium sulfate hemihydrate composition.

2. The process as claimed in claim 1, wherein the selected polycarboxylic dispersant comprises 100% by number of structural units (1) and (2), excluding terminal chain units.

3. The process as claimed in claim 1 or claim 2, wherein m equals zero and n varies from 5 to 160.

4. The process as claimed in claim 1 or claim 2, wherein the ratio of the number of structural units (2), which corresponds to esters of structural units (1), to the total number of structural units (1) and (2) is comprised between 5% and 50%.

5. The process as claimed in claim 1 or claim 2, wherein R is an alkyl group containing 4 to 5 carbon atoms, preferably R is a methyl, ethyl, propyl or butyl radical.

6. The process as claimed in claim 2, wherein m equals zero, n varies from 7 to 120, the ratio of the number of structural units (2), which corresponds to esters of structural units (1), to the total number of structural units (1) and (2) is comprised between 15% and 40%.

7. The process as claimed in claim 1, wherein the polycarboxylic dispersant is obtained by copolymerizing a monomer (a) represented by formula (A) below with at least one monomer (b) selected from compounds represented by formula (B) below:

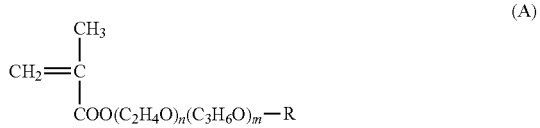

-continued

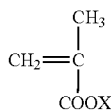
(B)

in which X represents a hydrogen atom, an alkali metal, an alkaline-earth metal or an ammonium; n is a whole number varying from 1 to 250, m is 0; the propylene oxide groups may or may not be randomly distributed among the ethylene oxide groups; R represents an alkyl group containing 1 to 12 carbon atoms.

8. The process as claimed in claim 1, wherein the selected polycarboxylic dispersant is obtained by partial esterification of a polymethacrylic acid with a polyether containing a free hydroxyl group that can react with a carboxylic function of said polymethacrylic acid, with general formula:

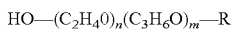

in which n is a whole number varying from 1 to 250, m is 0, the ethylene oxide and propylene oxide groups may or may not be randomly distributed; and R represents an alkyl group containing 1 to 12 carbon atoms.

9. The process as claimed in claim 8, wherein the polymethacrylic acid is obtained by polymerizing a mixture of monomers comprising at least 75 mole % of methacrylic acid and at most 25 mole % of a methacrylic acid co-monomer.

10. The process as claimed in claim 1, wherein the quantity of residual reagents remaining after producing the selected polycarboxylic dispersant having resulted in the formation of structural units (1) and/or (2) is less than 20% by weight with respect to the total dry weight of dispersant.

11. The process as claimed in claim 8, wherein the quantity of residual reagents remaining after producing the selected polycarboxylic dispersant having resulted in the formation of structural units (1) and/or (2) is less than 10% by weight with respect to the total dry weight of dispersant.

12. The process as claimed in claim 8, wherein the quantity of residual reagents remaining after producing the selected polycarboxylic dispersant having resulted in the formation of structural units (1) and/or (2) is less than 2% by weight with respect to the total dry weight of said dispersant.

13. A composition comprising an aqueous calcium sulfate hemihydrate and a dispersant, wherein the calcium sulfate hemihydrate composition has a weight ratio of water/calcium sulfate hemihydrate of 0.55 to 0.75, and the selected dispersant, simultaneously with its dispersing action, can control the initial and/or final setting time for aqueous calcium sulfate hemihydrate compositions, said dispersant selected from polycarboxylic dispersant comprising at least 75% by number, of a random linear chain formation of structural units (1) and (2) represented by the following formulae:

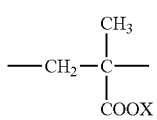
(1)

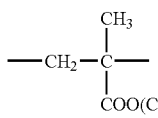
(2)

in which X represents a hydrogen atom, an alkali metal, an alkaline-earth metal or an ammonium; said structural units (1) may be identical or different; n is a whole number varying from 1 to 250, m is 0; the propylene oxide groups may or may not be randomly distributed among the ethylene oxide groups; R represents an alkyl group containing 1 to 12 carbon atoms; the structural units (2) may be identical or different; the ratio of the number of structural units (2) to the total number of structural units (1) and (2) being comprised between 5% and 60%, and wherein in a "Smith's Ring" plaster cake test performed at 23° C.±2° C. said dispersant controls the initial and final setting times for the aqueous calcium sulfate hemihydrate composition.

14. The composition of claim 13, wherein the selected dispersant comprises 100% by number of structural units (1) and (2), excluding terminal chain units.

15. The composition of claim 13 or claim 14, wherein the quantity of selected dispersant added to the aqueous calcium sulfate hemihydrate composition is comprised between 0.01% and 2% dry weight with respect to the weight of calcium sulfate hemihydrate, and hydraulic binder is at least 80% by weight calcium sulfate hemihydrate.

16. The composition of claim 13 or 14, wherein m equals zero and n varies from 5 to 160.

17. The composition of claim 13 or 14, wherein the ratio of the number of structural units (2), which corresponds to esters of structural units (1), to the total number of structural units (1) and (2) is comprised between 5% and 50%.

18. The composition of claim 13 or 14, wherein R is an alkyl group containing 1 to 5 carbon atoms, preferably R is a methyl, ethyl, propyl or butyl radical.

19. The composition of claim 14, wherein m equals zero, n varies from 7 to 120, the ratio of the number of structural units (2), which corresponds to esters of structural units (1), to the total number of structural units (1) and (2) is comprised between 15% and 40%.

20. The composition of claim 13, wherein the dispersant is obtained by copolymerizing a monomer (a) represented by formula (A) below with at least one monomer (b) selected from compounds represented by formula (B) below:

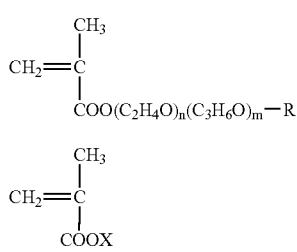

in which X represents a hydrogen atom, an alkali metal, an alkaline-earth metal or an ammonium; n is a whole number varying from 1 to 250, m is 0; the propylene oxide groups may or may not be randomly distributed among the ethylene oxide groups; R represents an alkyl group containing 1 to 12 carbon atoms.

21. The composition of claim 13, wherein the selected dispersant is obtained by partial esterification of a polymethacrylic acid with a polyether containing a free hydroxyl group that can react with a carboxylic function of said polymethacrylic acid, with general formula:

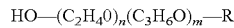

in which n is a whole number varying from 1 to 250, m is 0, the ethylene oxide and propylene oxide groups may or may not be randomly distributed; and R represents an alkyl group containing 1 to 12 carbon atoms.

22. The composition of claim 21, wherein the polymethacrylic acid is obtained by polymerizing a mixture of monomers comprising at least 75 mole % of methacrylic acid and at most 25 mole % of a methacrylic acid co-monomer.

23. The composition of claim 13, wherein the quantity of residual reagents remaining after producing the selected dispersant having resulted in the formation of structural units (1) and/or (2) is less than 20% by weight with respect to the total dry weight of dispersant.

24. The composition of claim 21, wherein the quantity of residual reagents remaining after producing the selected dispersant having resulted in the formation of structural units (1) and/or (2) is less than 10% by weight with respect to the total dry weight of dispersant.

25. The composition of claim 21, wherein the quantity of residual reagents remaining after producing the selected dispersant having resulted in the formation of structural units (1) and/or (2) is less than 2% by weight with respect to the total dry weight of said dispersant.

26. The method of claim 1, further comprising the step of: processing the mixed aqueous calcium sulfate hemihydrate composition and dispersant to obtain plasterboard or wallboard.

27. The method of claim 1, wherein the polycarboxylic dispersant is an esterified polymethacrylic acid having a mean number of ethylene oxide groups per polyether chain of 45 and the percentage of ester functions in the dispersant is 20%, wherein the percentage is based on the ratio of the number of structural units (2) to the total number of structural units (1) and (2).

28. A process for dispersing an aqueous calcium sulfate hemihydrate composition and controlling the initial setting and/or final setting time of said aqueous calcium sulfate hemihydrate, comprising the steps of:

providing an aqueous calcium sulfate hemihydrate composition having a weight ratio of water/calcium sulfate hemihydrate of 0.55 to 0.75; and admixing with the aqueous calcium sulfate hemihydrate a selected polycarboxylic dispersant, said dispersant comprising between 0.02% and 2% dry weight with respect to the weight of the calcium sulfate hemihydrate, and wherein the polycarboxylic dispersant comprises 100% by number, excluding terminal chain units, of a random linear chain formation of structural units (1) and (2) represented by the following formulae:

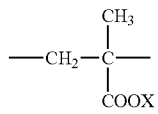

(1)

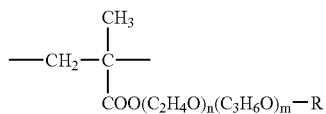

(2)

in which X represents a hydrogen atom, an alkali metal, an alkaline-earth metal or an ammonium; said structural units (1) may be identical or different; n is a whole number varying from 5 to 160, m is 0; the propylene oxide groups may or may not be randomly distributed among the ethylene oxide groups; R represents an alkyl group containing 1 to 4 carbon atoms; said structural units (2) may be identical or different; the ratio of the number of structural units (2) to the total number of structural units (1) and (2) being comprised between 5% and 60%, and wherein in a "Smith's Ring" plaster cake test performed at 23° C.±2° C. said dispersant controls the initial and final setting times for the aqueous calcium sulfate hemihydrate composition.

* * * * *